United States Patent [19]

Huang

[11] Patent Number: 5,007,176

[45] Date of Patent: Apr. 16, 1991

[54] SIMPLY-CONSTRUCTED INSTRUMENT FOR MEASURING HORIZONTAL LINE, VERTICAL LINE AND ANGLES

[76] Inventor: Ming-Chuan Huang, P. O. Box 55-1670, Taipei 10477, Taiwan

[21] Appl. No.: 591,242

[22] Filed: Oct. 1, 1990

[51] Int. Cl.$^5$ ............................................... G01C 9/20
[52] U.S. Cl. .......................................... 33/377; 33/343
[58] Field of Search ................. 33/377, 384, 385, 386, 33/388, 387, 389, 451, 365, 340, 341, 343

[56] References Cited

U.S. PATENT DOCUMENTS

| | | | |
|---|---|---|---|
| 2,541,215 | 2/1951 | Davis | 33/377 |
| 2,584,917 | 2/1952 | Powell | 33/377 |
| 3,699,661 | 10/1972 | Baltz | 33/377 |

FOREIGN PATENT DOCUMENTS 0073613  5/1982  Japan ................................. 33/377

Primary Examiner—Harry N. Haroian

[57] ABSTRACT

An instrument for measuring angles, vertical line or horizontal line includes a square casing having two axial lines crossing at a center of the casing and having a colored liquid filled in the casing, and a rotating disc rotatably mounted on the casing, in which the rotating disc is formed with an upper half circle portion radially formed with a plurality of angular graduations in terms of degrees, and formed with a lower half circle portion having two vertical columns parallelly formed below a diametrical line dividing the two half circle portions, and at least a reference line linked between any two horizontal graduations respectively formed in the two vertical columns, whereby upon a rotation of the disc to parallel the reference line to a liquid level of the colored liquid, an angle can be obtained by matching the angular graduation with any one axial line when the casing is laid on or coincided with a plane to be measured.

4 Claims, 3 Drawing Sheets

SIMPLY-CONSTRUCTED INSTRUMENT FOR MEASURING HORIZONTAL LINE, VERTICAL LINE AND ANGLES

BACKGROUND OF THE INVENTION

A conventional bubble level includes a bent glass tube filled with water or alcohol having an air bubble formed in the bent tube, by which the air bubble once floats to a central highest position as defined by two graduations, it may judge a plane overlain by the bubble level to be a horizontal plane or not. However, the air bubble may quickly "run" in the bent glass tube to thereby delay the finding out of a real horizontal plane. The simple two graduations formed on a central highest position of the bent glass seem to be a rough scale, unsuitable for a precision measurement of an absolute horizontal plane.

A conventional plumb bob may be used for checking a vertical line by hanging a plumb weight on a line. However, once blown by wind or shaken by an external force, the line and plumb may swing to influence the measurement of a vertical line, especially when the vertical line is expected immediately.

The present inventor has found the defects of a conventional level and plumb bob, and invented the present simply-constructed measuring instrument.

SUMMARY OF THE INVENTION

The object of the present invention is to provide an instrument including a square casing having an inner jacket filled with coloured liquid and a rotating disc rotatably mounted on a center of the casing having an upper half circle portion formed with angular graduations thereon and having two parallel vertical columns formed on a lower half circle portion each column formed with a plurality of horizontal graduations each horizontally interpolating to the other corresponding horizontal graduation formed on the other column, whereby upon an alignment of the coloured liquid level with any two corresponding horizontal graduations of the two parallel columns, an angle of a plane where the square casing overlies can be measured precisely and conveniently.

DETAILED DESCRIPTION

Figure 1:
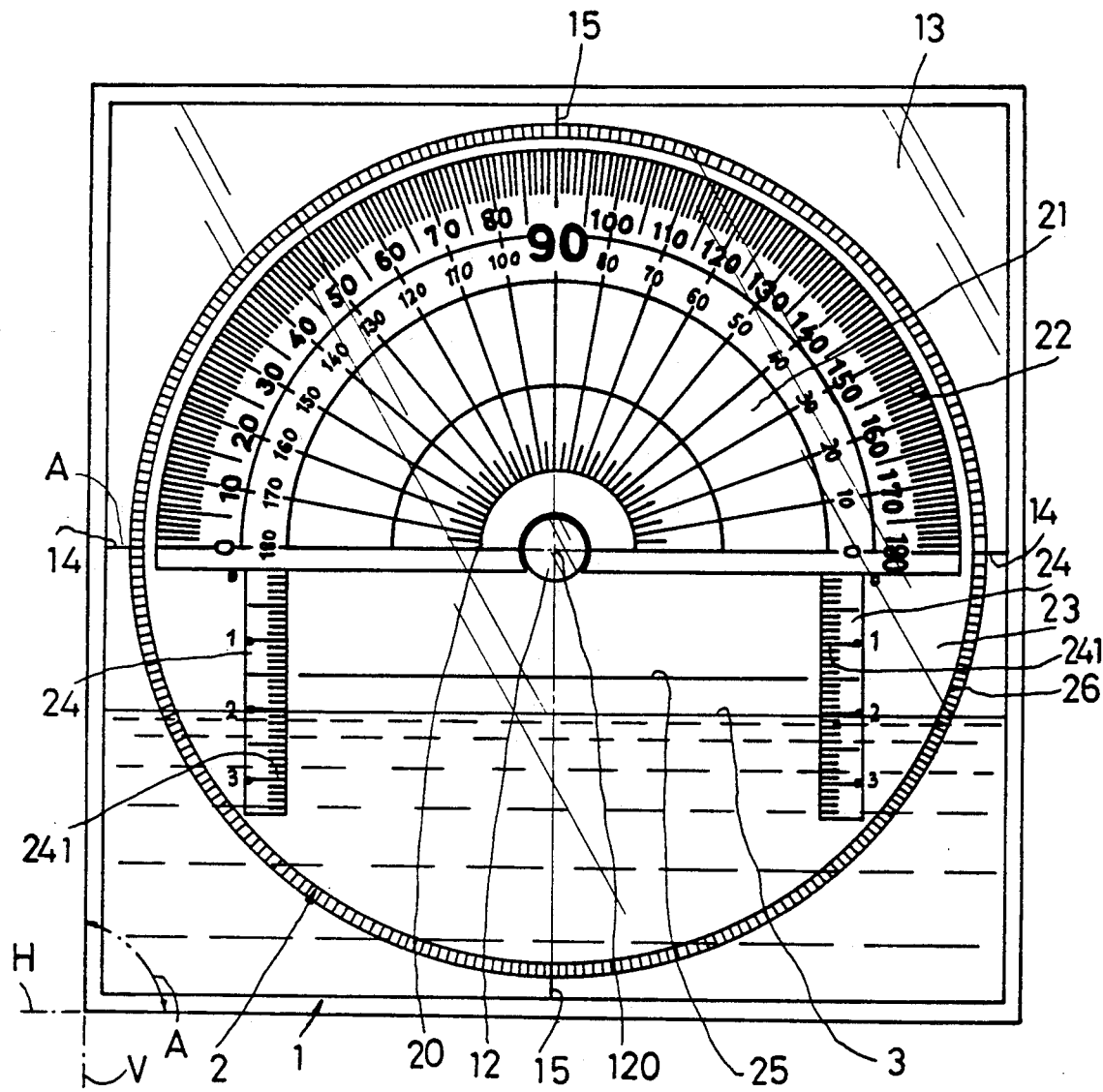
FIG. 1 is a front elevational drawing of the present invention.
Figure 2:
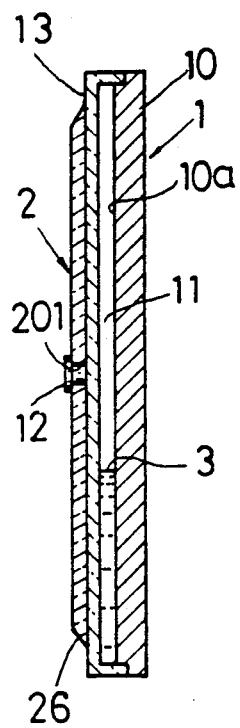
FIG. 2 is a side view sectional drawing of the present invention.

As shown in FIGS. 1 and 2, the present invention comprises: a casing 1, a rotating disc 2 and a coloured liquid 3 filled in the casing 1.

The casing 1 generally square shaped includes: a square base plate 10, a square covering plate 13 covering the base plate 10, an inner jacket 11 sandwiched between the base plate 10 and the covering late 13, a central pivot 12 formed on a central portion of the plate 13 about a center 120 of the plate 13, two axial lines 14, 15 crossing each other at the center 120 of which one axial line 14 is perpendicular to two vertical side walls 16 and parallel to two horizontal side walls 16, and the other axial line 15 is perpendicular to the two horizontal walls 16, but parallel to the two vertical walls 16. All four side walls 16 form a square of the casing 1.

The rotating disc 2 and the covering plate 13 are made of transparent materials. A front surface 10a of the base plate 10 is preferably made of white-color background contrast to the coloured liquid for a clear vision of the disc 2.

The coloured liquid 3 is filled in the inner jacket 11 of the casing 1, and is selected from a liquid having less cohesion to any side wall in the jacket 11 or having low viscosity for enhancing fluid flow for measuring easiness.

The rotating disc 2 includes: a central hole 201 pivotally engaged with the pivot 12 of the plate 13 for rotatably mounting the disc 2 on the casing 1, an upper half circle portion 21 and a lower half circle portion 23 divided by a central diametrical line 20 passing the center 120, a plurality of angular graduations 22 radially formed on a periphery of the upper half circle portion 21 each graduation 22 corresponding to one degree of 360 degrees of a full circle, two vertical columns 24 parallelly formed under the diametrical line 20 each column 24 formed with a plurality of horizontal graduations 241, and an annular perimeter 26 of the disc formed as corrugated sloping surface adapted for frictionally holding the disc 2 for its smooth rotation.

Any two corresponding horizontal graduations 241 of the two vertical columns 24 are interpolated to form a straight line parallel to the diametrical line 20 of disc 2 and are to extrapolated to be perpendicular to any vertical side wall 16. A horizontal reference line 25 is printed or formed between two central graduations 241, to be parallel to a rear liquid level of the coloured liquid 3 filled in the casing 1. The liquid level of the liquid 3 should be slightly positioned under or above the reference line 25 when placing the casing 1 on a horizontal plane. Naturally, there may be provided with a plurality of reference lines 25 each connected between two corresponding horizontal graduations 241. The scale or space between every two graduations 241 in one column 24 is not limited and not critical. The space between every two graduations 241 may e 1 milli-meter, for instance.

Figure 3:
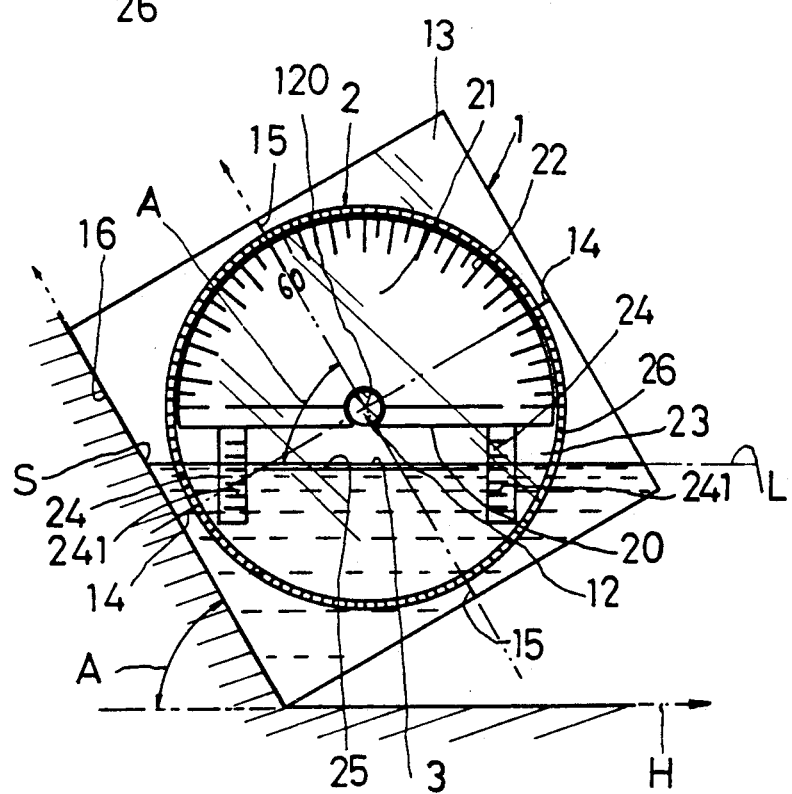
FIG. 3 is an illustration showing the measurement of a sloping surface with the present invention.

When using the present invention for measuring a sloping angle A as shown in FIG. 3, one side wall 16 is laid on the sloping surface S and the disc 2 is rotated about pivot 12 to allow the reference line 25 to be parallel to the liquid level L of the liquid 3 which level L is parallel to a real horizontal plane or level H so as to obtain an angle A such as 60 degrees by aligning the axial line 15. Since the sloping surface S forms the angle A with the horizontal plane H. Level L is parallel to horizontal plane H and line 15 is parallel to sloping surface 5 so that the angle A as defined by the axial line 15 with the level L is the true angle to be measured. The angular graduations 22 projectively matched with the axial line 15 can be directly read from the disc, for example, 60 degrees as shown in FIG. 3.

Figure 4:
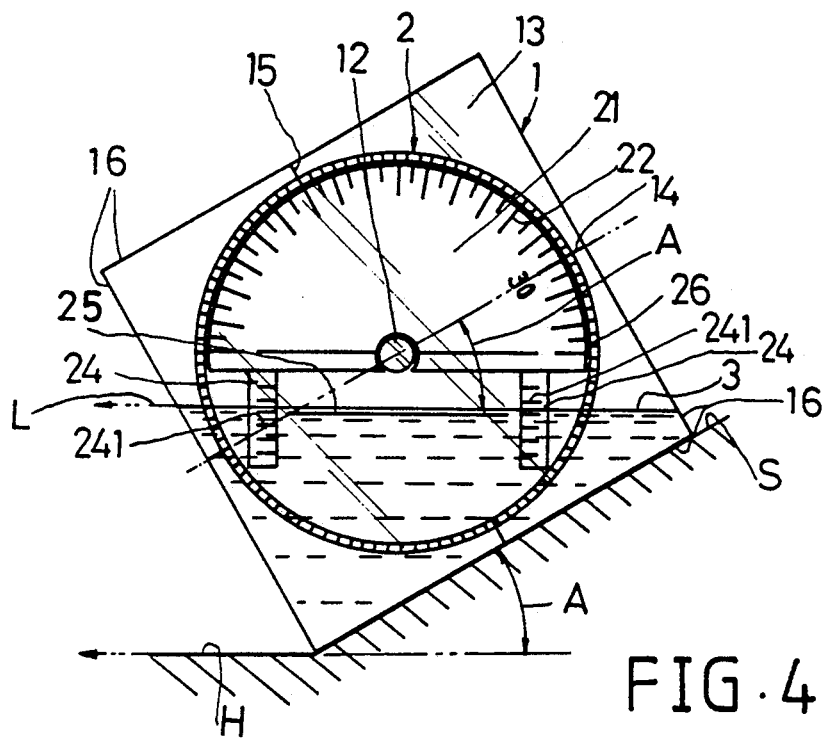
FIG. 4 shows another measurement by the present invention.

In FIG. 4, another sloping degree such as 30 degrees can be obtained by the method as above-mentioned. By the same way, a vertical line V (A=90 degrees) as shown in FIG. 1 can be obtained or checked if the reference line 25 is parallel to the liquid level while a left side wall 16 is coincided with the left-side plane and the angular graduation matched with the axial lie 15 shows a value of 90. The reference line 25 when parallel to the liquid level also shows a horizontal plane H on which the casing 1 is laid as shown in FIG. 1.

Figure 5:
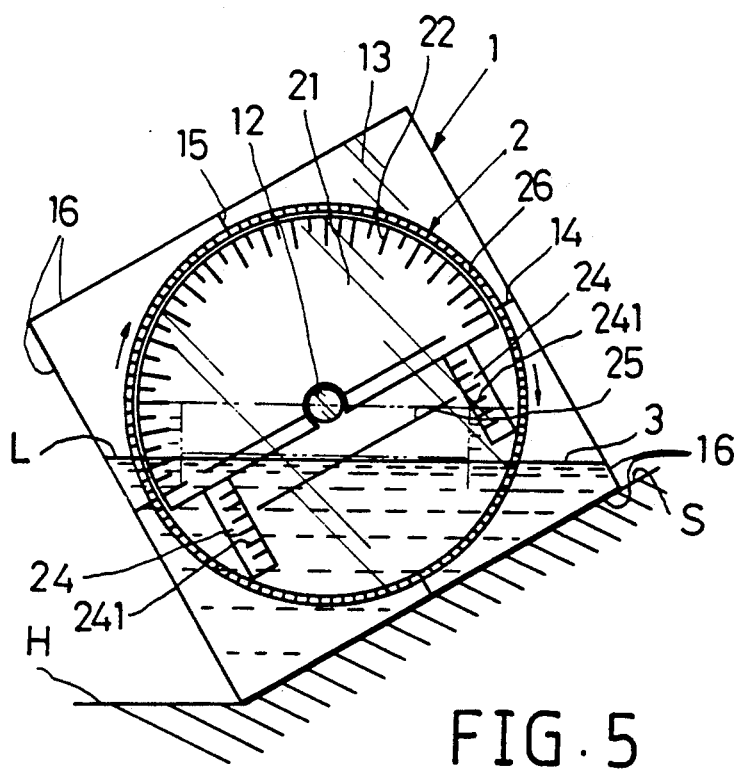
FIG. 5 shows the adjustment to parallel two horizontal graduations with the liquid level in accordance with the present invention.

FIG. 5 shows a method to rotate the disc 2 to allow the reference line 25 between two horizontal graduations 241 of the two columns 24 to be parallel to the liquid level L in order to measure a sloping angle.

The present invention can be made as a compact unit to be easily portable and low cost, which can be used for measuring a vertical line, a horizontal line or any sloping angles in a very convenient way.

The present invention may be in contact with a ceiling or a beam under a roofing by aligning an upper side wall 16 with the ceiling surface or beam bottom to check whether it is a horizontal plane, which can not be done by a conventional bubble level.

I claim:

1. An instrument for measuring angles comprising:
a casing generally square shaped and formed with four sides walls, a transparent covering plate and a base plate, said casing forming an inner jacket and two axial lines crossing each other at a center of said transparent covering plate of said casing, of which one axial line is perpendicular to two vertical side walls but parallel to the other two horizontal side walls, and the other axial line is perpendicular to the two horizontal side walls but parallel to the two vertical side walls;
a coloured liquid filled in said inner jacket of said casing; and a rotating disc generally made of transparent material pivotally mounted at a center of said transparent covering late of said casing including an upper half circle portion above a central diametrical line passing the center of said covering plate of said casing radially formed with a plurality of angular graduations in term of degrees and a lower half circle portion below the central diametrical line formed with two vertical columns parallel with each other, said two columns respectively formed with a plurality of horizontal graduations of which any two corresponding horizontal graduations of said two columns are interpolated to form a reference line between the two horizontal graduations parallel to said diametrical line,
whereby upon a rotation of said rotating disc about a pivot formed at the center of said casing to allow said reference line between said two horizontal graduations to be parallel to a liquid level of said coloured liquid, an angle an be obtained by matching the angular graduation with one of said axial lines formed on said covering plate when said casing is laid on or coincided with a plane to be measured.

2. An instrument according to claim 1, wherein said disc is formed with a corrugated sloping surface along a perimeter of said disc.

3. An instrument according to claim 1, wherein said base plate having a white-color background formed on a front surface of said base plate, said base plate and said transparent covering plate defining said inner jacket for filling said coloured liquid therein, said white-color background serving as a contrast background of the coloured liquid for a clear vision of the graduations forms on the disc.

4. An instrument according to claim 1, whrerin said coloured liquid filled in said casing has a liquid level generally positioned slightly higher or lower than said reference line formed or printed between two said horizontal graduations when said casing is laid on a horizontal plane.

* * * * *